United States Patent

Hanson

[11] 4,019,621
[45] Apr. 26, 1977

[54] DOUGH PLACER IMPROVEMENTS

[76] Inventor: Douglas R. Hanson, 1720-9th Ave. S., Anoka, Minn. 55303

[22] Filed: Aug. 4, 1975

[21] Appl. No.: 601,352

[52] U.S. Cl. .............................. 198/432; 198/491; 198/531; 198/813; 198/836; 425/383
[51] Int. Cl.$^2$ ....................................... B65G 47/22
[58] Field of Search ............ 198/34, 76, 160, 204, 198/432, 491, 531, 813, 836; 53/160; 425/383

[56] References Cited

UNITED STATES PATENTS

| | | | |
|---|---|---|---|
| 1,180,030 | 4/1916 | Green | 198/76 X |
| 1,312,640 | 8/1919 | Mallinckrodt | 198/34 X |
| 2,703,668 | 3/1955 | Baechle | 198/34 X |
| 2,728,508 | 12/1955 | Marasso | 198/34 X |
| 2,750,899 | 6/1956 | Marasso | 53/160 X |
| 2,751,591 | 6/1956 | Marasso | 53/160 |
| 2,815,112 | 12/1957 | Engleson et al. | 198/34 X |
| 3,224,556 | 12/1965 | Stram | 198/76 X |
| 3,301,376 | 1/1967 | Winter et al. | 198/31 AB |
| 3,527,173 | 9/1970 | Mullvain et al. | 425/383 |

Primary Examiner—Johnny D. Cherry
Assistant Examiner—Richard K. Thomson
Attorney, Agent, or Firm—Dugger, Johnson & Westman

[57] ABSTRACT

In a dough panning device, the dough piece orienter and intermediate guide sheet are mounted to permit longitudinal sliding movement along guide bars so that when the delivery end of the conveyor belt is moved to tension the belt these apparatus will maintain a proper relationship thereto. Also provided are adjustable side guides for the baking pans which may be individually adjusted laterally by means of parallel mounting links which are maintained in adjusted positions by friction clutches.

10 Claims, 9 Drawing Figures

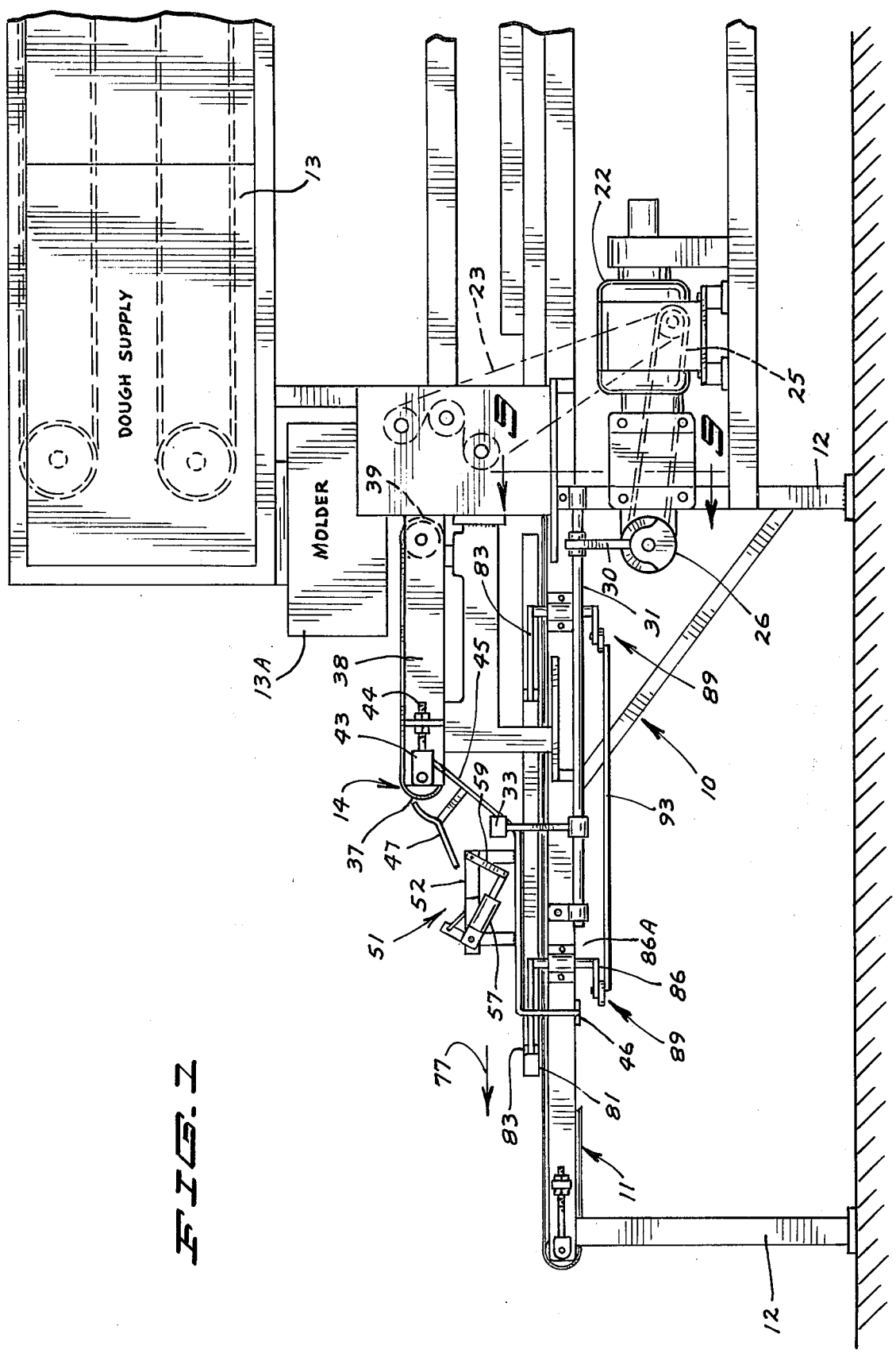

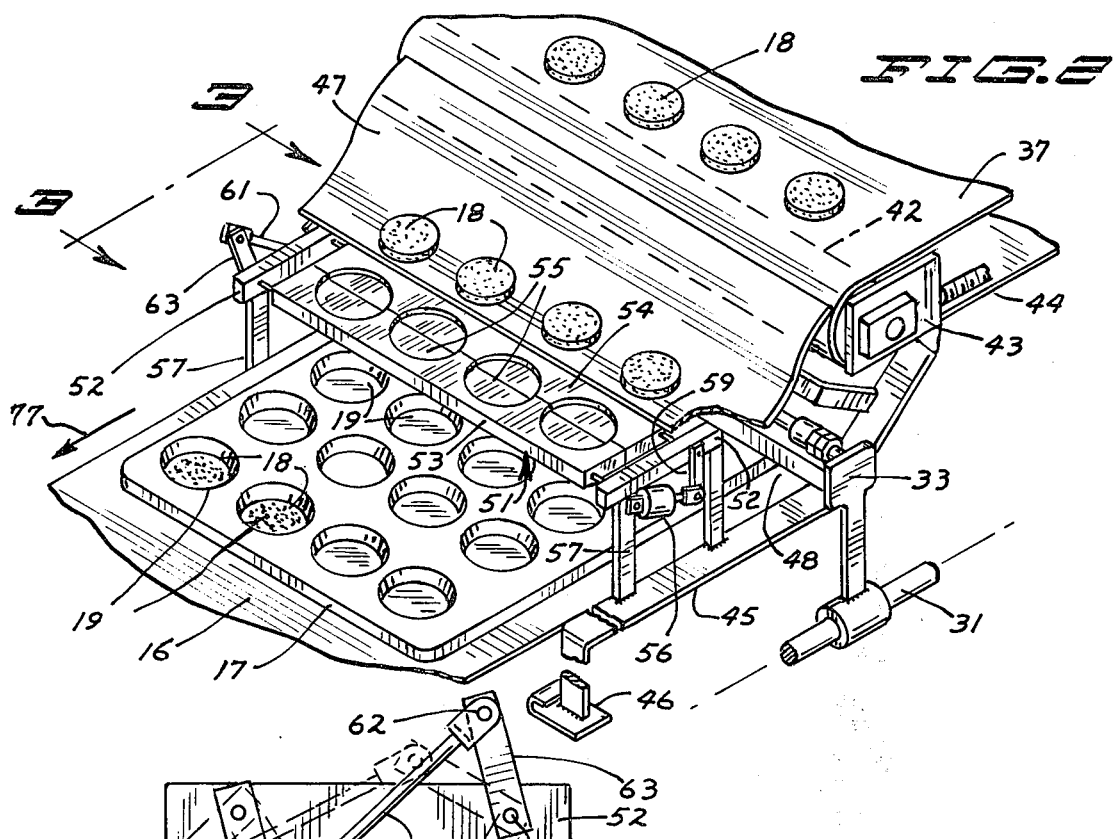
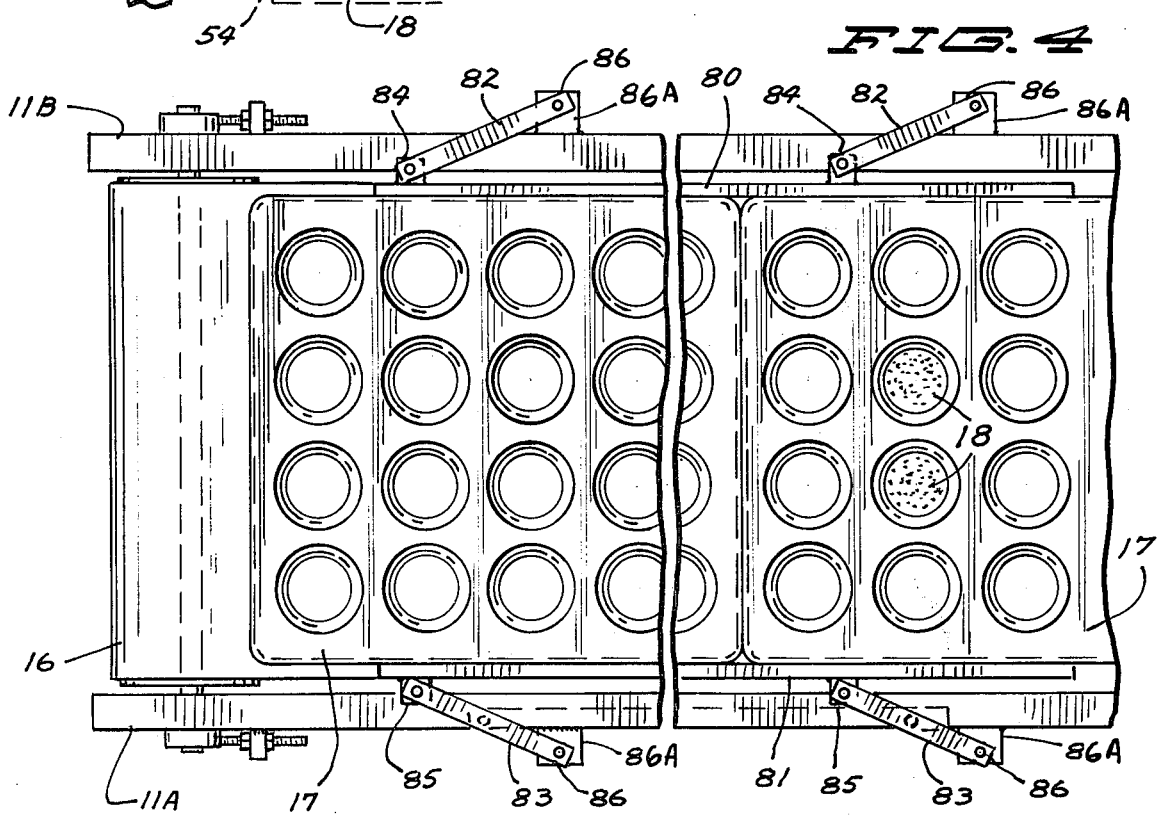

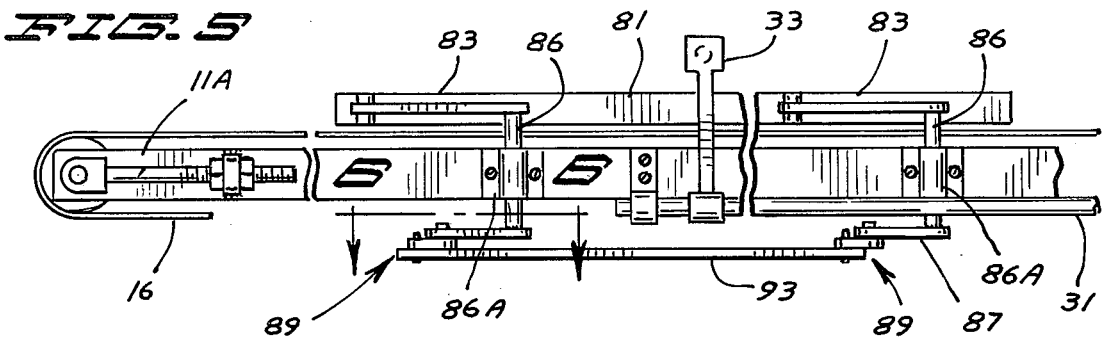
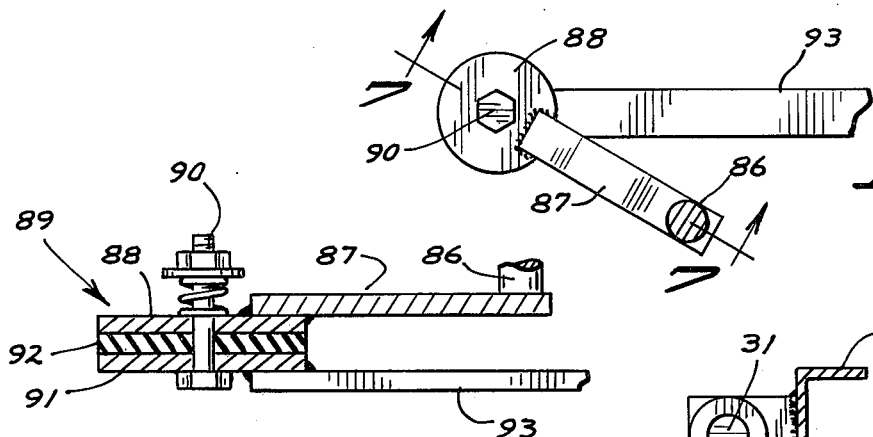
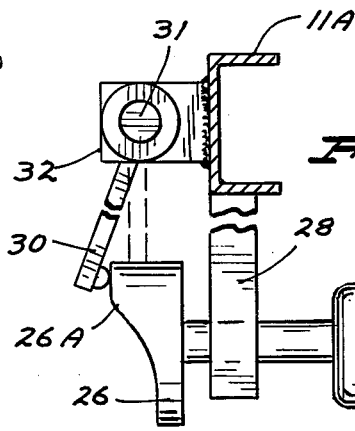
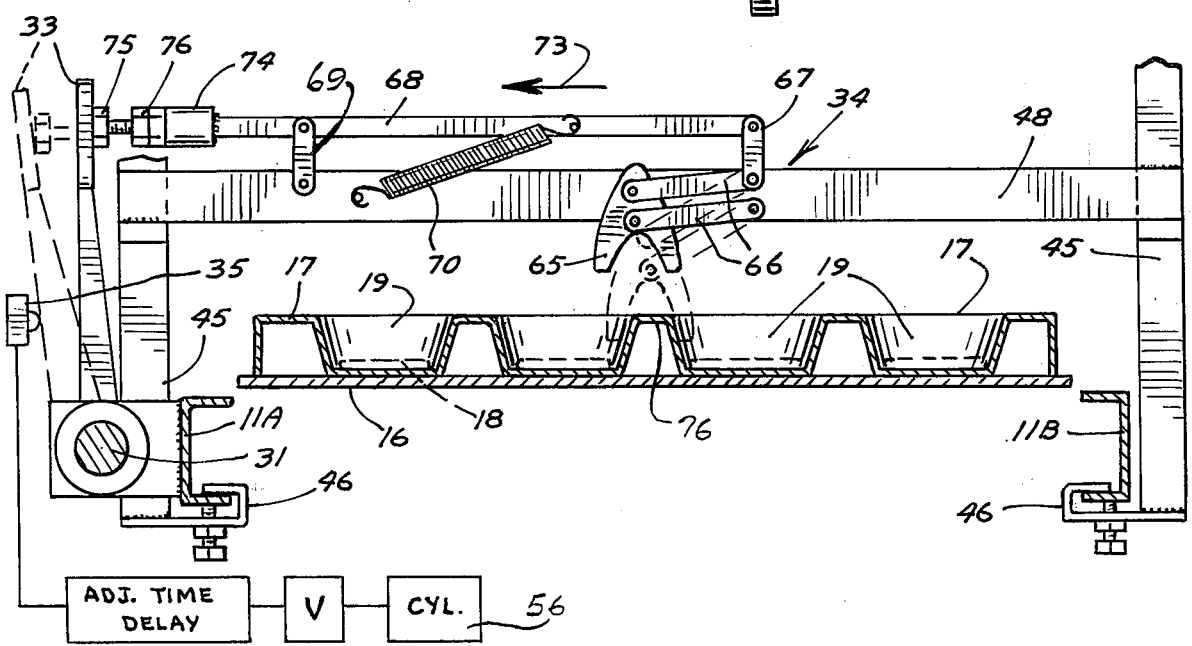

DOUGH PLACER IMPROVEMENTS

BACKGROUND OF THE INVENTION

1. Field of the Invention

The present invention relates to dough feeding machines which place pieces of dough into conveyorized baking pans.

2. Prior Art

In the prior art, a standard automatic dough feeding machine is the PAN-O-MAT machine, made and sold by The United Machinery Company, subsidiary of American Machine and Foundry Co. The large machines have been in use for several years but do have some limitations in operation. Certain improvements in dough piece orienters, or dough panning devices which can be attached to the PAN-O-MAT machine are illustrated in U.S. Pat. No. 3,527,173.

The present device includes further improvements in adjustment devices and operating units for insuring that dough pieces are properly handled, and properly positioned into baking pans that are carried on conveyors.

SUMMARY OF THE INVENTION

The present invention relates to improvements in the ability to align and adjust, and reliably operate dough piece panning or orienting mechanisms for placing pieces of dough into pans on a moving conveyor below the orienter.

As part of the improvements, adjustment devices are provided for the means positioning the pans, both as to lateral or side-to-side placement, and to fore and aft placement. The panning or orienting device is also operated in a simple mechanical manner to insure that it will be positively operated at the proper time. The operator comprises a pneumatic cylinder that can have electro-pneumatic controls for ease of changing the timing of operation, through the use of adjustable timing circuits.

Additionally, mechanical adjustments are shown, which permit the adjusting of tension on a dough loading conveyor belt for moving the dough pieces and at the same time moving the other related components a corresponding amount to insure that they will remain aligned precisely.

The device utilizes simple mechanical mechanisms for achieving the end results of more precise placement of dough pieces into baking pans that are moving on a conveyor with respect to the panning or orienting device.

BRIEF DESCRIPTION OF THE DRAWINGS

FIG. 1 is a side elevational view of a typical dough feeding and panning machine including improvements made according to the present invention;

FIG. 2 is a schematic perspective view of a dough orienting device including improvements made according to the present invention;

FIG. 3 is a fragmentary side view taken as on line 3—3 in FIG. 2;

FIG. 4 is a schematic top plan view of a typical conveyor system showing lateral adjustment devices for guiding the baking pans used with the device shown in FIG. 1;

FIG. 5 is a side view of the device of FIG. 4;

FIG. 6 is a sectional view taken as on line 6—6 in FIG. 5;

FIG. 7 is a sectional view taken as on line 7—7 in FIG. 6;

FIG. 8 is a part schematic sectional view taken transversely of the device of FIG. 1 showing a baking pan locater utilized in standard dough feeding machines but including an adjustment device made according to the present invention; and FIG. 9 is a sectional view taken as on line 9—9 in FIG. 1.

DESCRIPTION OF THE PREFERRED EMBODIMENT

Referring first to FIG. 1, a dough feeding and panning machine indicated generally at 10 is shown only schematically because it is well known in the art, and the detailed improvements of the present invention will be shown in more detailed form.

The machine comprises a main frame 11, that is supported on support members 12 spaced along the frame side members. The frame side members comprises channels 11A and 11B, which have inwardly facing legs, as perhaps can be best seen in the sectional view such as FIG. 8, and these longitudinally extending channels 11A and 11B form the main longitudinal supports for the machine.

The dough feeding machine is made so it will feed dough from a dough supply 13 through a dough molder indicated generally at 13A which supplies pieces of dough onto a conveyor belt indicated generally at 14, and thence to a dough piece orienter or dough panning device indicated generally at 51. The frame 11 mounts an endless belt conveyor which can perhaps best be seen fragmentarily at least in FIGS. 4 and 5, and the belt is indicated at 16. The upper reach or length of the belt 16 supports compartmented baking pans 17 for receiving the dough pieces 18, as can perhaps also best be seen in FIG. 2. The belt 16 carries the pans 17 underneath the dough orienter device 51, and as will be more fully explained, the device 51 will be operated to drop formed pieces of dough 18, as shown for hamburger buns, into individual compartment 19 on the baking pans 17. This general type of orienter device is also shown schematically in U.S. Pat. No. 3,527,173, and thus will not be explained in great detail.

The dough feeding machine includes an electric motor 22 driving suitable gear reducers and a chain drive 23 which synchronizes the transfer conveyor belt assembly 14 with the conveyor belt 16, and provides a drive for both of these conveyors. The motor and gear reducer also provide means for driving a chain 25 to drive a timing shaft 27 that has an annular cam 26 thereon. The cam 26 has an outer annular wall that has an edge surface with differing axial extension as perhaps can best be seen in FIG. 9 and which will be more fully explained. The cam thus provides actuation or movement in axial direction.

The shaft 27, as shown in FIG. 9, is mounted on suitable bearings, for example, a bearing 28 depending from frame member 11A. The cam surface which varies in axial direction is used to actuate a cam follower lever 30 that is mounted onto a shaft 31 that is in turn mounted to bearings 32 mounted on member 11A. The shaft 31 extends longitudinally along the side of the frame member 11A. The shaft 31 is a timing shaft that is used for synchronizing dough piece orienting operations. The shaft is spring loaded so that the lever 30 would tend to follow the edge surfce of cam 26 as will be seen. The lower end of the lever 30 as shown in FIG.

9 is biased in a counter-clockwise direction, and the cam actuates the lever and shaft 31 so the shaft 31 operates in a clockwise direction when the high point of the cam indicated at 26A is engaged with the lever 30. The lever 30 can have a cam follower roller engaging the cam surface.

The shaft 31 also drives a paddle actuator 33 which extends above the frame members 11A and 11B, and which operates a pan retainer or indexer indicated generally at 34 in FIG. 8. This will be more fully explained as the description proceeds, but the actuation of the lever 31 and the paddle 33 is shown schematically as a timing operation which can in turn operate a suitable interlock switch 35 to provide a start signal for operating other components such as a solenoid valve for operating the dough panning device 51.

The dough molder 13A is of any desired form, and deposits the molded or formed pieces of dough 18 onto the belt 37 forming part of the conveyor 14. Conveyor 14 includes side frame members 38, a first roller 39, that can be powered from the motor 22 and synchronized therewith through chain drive 23, and a second roller 42 (FIG. 2) adjacent the end of the belt 37 as shown in FIG. 2 as well as in FIG. 1. The second roller 42 is mounted through a support 43 including a suitable bearing, and an adjustment screw 44 that can be used for adjusting the tension in the belt 37. Such adjusting supports 43 and screws 44 are used on both sides of the machine. The supports 43 are mounted in sliding guides and side frame supports 45 are fixedly attached to the supports 43. The side frame supports 45 extend downwardly and forwardly to a position adjacent the side frame members 11A and 11B, as shown in FIG. 8.

The lower ends of supports 45 are slidably mounted along the frame members 11A and 11B through the use of a U shaped clip 46 on each of the supports 45. The clips 46 are welded to supports 45 and have portions which fit around the lower leg of the channels 11A or 11B, respectively. These portions can be clamped to the channels with a suitable set screw or other clamping member. A set screw is shown on clips 46 for sake of simplicity. The supports 45 are used for supporting components that must be aligned with the end of belt 37, and thus when the tension of belt 37 is adjusted, the clips 46 for supports 45 are released and the supports 45 will slide along the frames 11A and 11B with supports 43. Components carried on the supports 45 will therefore still be positioned properly with respect to the belt 37.

To more fully appreciate the additional improvements, reference is now made specifically to the schematic showing in FIG. 2. A transfer sheet indicated generally at 47 is used for providing a guide for the hamburger bun dough pieces 18 as they come off the end of the belt 37. This type of arrangement is also shown in U.S. Pat. No. 3,537,173. The sheet 47 is attached to the supports 45 at opposite sides of the unit. A cross frame member 48 is attached to the supports 45. The member 48 extends across the unit and straddles the main conveyor belt, and also may be used for supporting the sheet 47 and other mechanism if desired. The sheet 47 may have a vibrator thereon if desired to insure proper transfer of the dough pieces.

The guide sheet 47 will move with the supports 43 and 45 when the adjustment screws 44 are utilized for adjusting the take-up on the belt 37. The guide sheet 47 guides the dough pieces 18 downwardly and in the general direction of movement of the upper length of the main conveyor belt 16 and the pans 17. The lower edge of the sheet 47 is positioned above the dough orienting device 51 which includes a gate assembly. The gate assembly has a pair of end frame members 52, 52 on opposite sides of the main conveyor belt and above the pans 17 on the upper reach of belt 16. The frame members 52, 52 are supported back to the supports 45 with legs 57 so that the orienter is carried directly with the supports 45, the sheet 47, and the supports 43. As the dough pieces indicated at 18 slide off the end of the sheet 47 under gravity, they will be deposited onto a pair of gate members 53 and 54, which together form a support defining receptacles or cavities 55 therein for receiving the dough pieces. The dough pieces are dropped by the molder onto the belt 37 substantially in alignment with the receptacles 55 but sometimes the pieces shift from their desired position in the direction of movement of the belt 37. The gate members 53 and 54 are operated to be closed when the dough pieces drop thereon, and the dough pieces will thus be momentarily stopped to permit them to be oriented properly with respect to a tray 17 beneath the gate assembly 51 so that the receptacles 19 of the tray are properly positioned.

The timing will be such that the interlock switch 35 will be actuated at the proper time to energize a solenoid valve to operate a power device, as shown a pneumatic cylinder 56. The base end of cylinder 56 is mounted onto one upright support member 57. The cylinder has an extendable and retractable rod which has a rod end 58 that in turn operates a lever 59 which is attached to a shaft or pin supporting the gate 54 and the lever pivots the gate member 54 with respect to the frame ends 52.

Referring now specifically to FIG. 3, when the gate member 54 pivots under action of the cylinder 56 as shown, it will rotate on support shafts provided on the device. A lever shown at 60 is attached to the shaft on the opposite end of the gate 54 from cylinder 56 and will rotate to its dotted line position shown in FIG. 3. The lever shown at 60 has a link 61 pivotally attached to it at its lower end, and the link 61 in turn extends to be attached as at 62 to a second lever 63 which is mounted onto the pivot shaft 64 for the gate section 53 of the dough orienter. This will cause the gate section 53 to pivot downwardly as shown in dotted lines at FIG. 3 as well, and the dough pieces 18 held in receptacles or cavities 55 on the gate assembly will be dropped downwardly toward a pan, as shown schematically in FIG. 3.

In order to insure proper location of a pan 17, a pan indexing finger member assembly 34 which is generally of conventional design, but which includes improvements as will be explained, is used and is shown in FIG. 8. The pan indexer mounts on the cross frame member 48, and comprises a bifurcated indexer finger 65 that is pivotally mounted to first ends of a pair of parallel links 66, 66 that are also pivoted to the cross frame member 48 as shown. The upper link 66 has a lever 67 fixed thereon. A cross link 68 is pivotally mounted to the lever 67. It is to be understood that the lever 67 drives the upper link 66, which pivots with respect to the cross member 48.

A second pivoted support lever 69 is used to support the cross link 68 parallel to the member 48, and a spring 70 is attached between the cross member 48 and the link 68 to urge the link 68 in the direction indicated by the arrow 73. At the end of the link 68 there is a tubular member 74 mounted that has a nut welded thereto, and a cap screw or similar device indicated at 75 is threaded into this end and held secure with a lock nut 76. The head of the cap screw 75 bears against the paddle end of paddle 33, under the urging of spring 70, and the spring 70 thus biases the shaft 31 in a counterclockwise direction, causing the cam follower 30 to ride against the surface of the cam 26.

The cam follower 30 will rotate the shaft 31 against the bias action of the spring 70, and when it does so, it will move the cross link 68, links 66 and the index finger 65 to the solid line position shown in FIG. 8, but as soon as the cam releases lever 30, the finger 65 will move to its normal position shown in dotted lines in FIG. 8 and the bifurcated finger of 65 will fit over a divider indicated at 76 between the center receptacles 19 of the aligned pan 17. The finger will rest against the side edges of the two center pockets. The conveyor belt 16 will be moving the tray 17 in direction as indicated by the arrow 77 in FIGS. 1 and 2, and finger 65 will hold the pan 17 properly positioned below the movable gate members 53 and 54. The pockets or receptacles 19 held by the indexing finger 65 will be properly aligned with the receptacles 53 in the panning device. The gates are then operated and the dough pieces will drop into the aligned pockets 19 and be centered therein.

When the cam 26 moves to its low cam position, the lever 30 and paddle 33 are then in their dotted line positions. The switch 33 is also actuated and may operate through a suitable adjustable time delay to energize a solenoid valve to actuate the cylinder 56 to open the gates 53 and 54, dropping the dough pieces 18 from the pockets 55 into the receptacles 19 of the properly positioned pan 17.

The adjustment on the link 68 permits the quick adjustment of the finger 65 with respect to the location where a pan is held. Thus if there is a small change in the linkage or wear in the linkage an adjustment is provided. The amount that the fingers 65 are premitted to move downwardly to hold the pan permits adjustment in the relative position of the pan with respect to the dough orienter because the amount the fingers of the bifurcated member 65 go into the circular openings of the receptacles 19 can be changed and if the bifurcated finger 65 is not permitted to move downwardly as much, it will change the relative position at which the finger holds the pan, because of the different spacings between the edges of the adjacent receptacles 19 at different points along the receptacles.

The finger 65 holds the pan at the receptacles 19 into which the dough pieces will be dropped by the dough piece orienter so that it is insured that the unit is properly positioned.

To insure the proper depositing of dough pieces 18 into the pan, the pans are guided in a transverse direction on the upper reach of the belt 16, and these guides are adjustable in the conventional machines. However, a wrench is usually necessary for adjusting these guides. In the present device a simple linkage is used with friction clutch means so that the lateral adjustments can be made quickly and conveniently. Referring specifically to FIG. 4, it can be seen that pans 17 are moving along the belt 16, and are positioned between first and second lateral guides 80 and 81, respectively. These guides 80 and 81 are each mounted on parallel link arms 82 and 83, respectively that are pivotally mounted to ears 84, 85 on the guides, respectively, and the arms 82, 83 are in turn supported on vertical shafts 86 on opposite sides of the machine. The shafts 86 are mounted on suitable bearings 86A attached to the respective side frames 11A, 11B. The shafts 86 extend downwardly to a position below the side frame members 11A and 11B, as shown perhaps best in FIG. 5. Each of the shafts 86 has a lever 86 mounted thereon which corresponds substantially in position to the upper arms 82 and 83 on the respective sides of the machine.

Each of the arms 87 in turn has a plate member 88 fixed thereto with the plate 88 forming one portion of the friction clutch indicated generally at 89 in FIG. 7, and these plates 88 are connected through a spring loaded bolt 90 to a lower plate 91 through a friction disk 92. The lower plate 91 thus is frictionally pivotally mounted with respect to the upper plate 88. The two lower disks 91 on each of the sides of the machine are connected together by a separate link 93 so that the two arms 87 on each side of the machine are connected to be movable as a parallel linkage, just as the support levers 82 and 83 are. Thus, the guides 80 and 81 are controlled by pivoting of the shaft 86, and this pivoting in turn is controlled and retained by the friction clutch assemblies 89.

Adjusting the guides 80 and 81 individually is easily done and the friction clutches 89 provide adequate holding force to guide the pans 17 in the desired path to insure that the pockets 19 are exactly aligned along a transverse line with the pockets 55 when the finger 65 holds the pans in position to let dough pieces drop.

Therefore, the improvements relate to the precise tuning of the machine to insure that adequate adjustments are provided to reliably place dough pieces into the proper receptacles of moving pans on a conveyor belt below an intermediate dough orienter.

What is claimed is:

1. In combination with a dough feeding machine having a main frame and including a discharge conveyor for carrying dough pieces and for discharging dough pieces in direction toward a baking pan positionable below the discharge end of the conveyor, and a dough piece orienter means comprising a pair of gate members movable to a first position to receive said dough pieces and position them with respect to a baking pan, and movable to a second position to discharge said dough pieces, and wherein said conveyor includes adjustment means at the discharge end for adjusting the tension of the belt, the improvement comprising support means attached to said adjustment means and movable with the adjustment means for supporting said dough piece orienter with respect to said machine, slidable guide means mounted on said main frame and supporting portion of said support means, said dough piece orienter means including actuator means mounted on said support means for actuating said gate members, said actuator means comprising fluid pressure cylinder means, lever means connected between said fluid pressure cylinder means and one of said gate members to pivot said one gate member when the cylinder means is operated, and linkage means betwen said one gate member and the other gate member to cause simultaneous operation of said gate members from said first position to said second position.

2. The combination as specified in claim 1 wherein said dough feeding machine includes indexing means for indexing baking pans beneath said dough piece orienter means, said indexing means being mounted on said support means.

3. The combination as specified in claim 2 and control means for said gate members including switch means responsive to operation of said indexing means to provide a signal for moving said gate members.

4. The combination as specified in claim 2 wherein said dough feeding machine includes a baking pan conveyor positioned below said dough piece orienter, and said indexing means comprises an index finger movable between a released position, and a second position where said index finger holds a baking pan on said baking pan conveyor in proper position beneath said gate members to receive dough pieces dropped by said gate members, actuator means for said index finger including a paddle reciprocating about a pivot axis, a push link connected to said index finger, said paddle bearing against said push link, and an adjustable means between said paddle and said push link to permit adjustment of the amount that said index finger moves during reciprocating movement of said paddle.

5. The combination as specified in claim 4 wherein said adjustable means includes a threadable member linearly adjustable with respect to said paddle.

6. The combination as specified in claim 1 wherein said dough feeding machine includes conveyor means for baking pans to move baking pans below said dough piece orienter means, a timing shaft, means on said timing shaft for operating said indexing means to retain a baking pan in position below said dough piece orienter means, and lateral guide means for laterally positioning baking pans carried by said conveyor means in position below said dough piece orienter means, said lateral guide means including linkages supporting said lateral guide means, and friction clutch means on said linkages to permit frictional movement of said lateral guide means relative to each other and to provide frictional retaining force on said guide means.

7. The combination as specified in claim 6 wherein said linkage means comprises a pair of links pivotally mounted on each of said lateral guide means, and means to also pivotally mount said lateral guide means to said dough feeding machine, and a second connecting means spaced from said lateral guide means, means connected to the second links and to the means to pivotally mount the lateral guide means to cause said second links to be generally parallel to the lateral guide means, said friction clutch means being positioned to act between said second links and the means connected to the second links.

8. The combination as specified in claim 1 wherein said gate members are pivotally mounted and said linkage means includes first and second lever arms connected to the respective gates, and a link pivotally connected to said first and second lever arms.

9. The combination as specified in claim 1 wherein said dough feeding machine includes second conveyor means for baking pans to move baking pans below said dough piece orienter and lateral guide means for laterally positioning baking pans carried by said second conveyor means in position below dough piece orienter, said lateral guide means including support linkages having at least one pivoting connection and friction means at the pivoting connection to provide a friction retaining force on said lateral guide means and permit movement of said lateral guide means when retaining force is exceeded.

10. In a dough feeding machine including a pan conveyor movable in a first direction, and having a pair of guides, one adjacent each of the sides of said conveyor for guiding said pan in a desired path, said guides each being mounted on opposite sides of said machine with a pair of links pivotally mounted to said guides in spaced relationship therealong, a pair of shafts mounted for substantially upright pivotal movement, said links being fixed to said shafts, and a separate arm member on each of said shafts positioned at an opposite end of said shaft from said links, said arms being fixed to said shaft, a separate connecting link positioned between associated pairs of said arm members, said separate connecting links being substantially parallel to said guides, and separate friction clutch means between each of said separate connecting links and each of its connected arm members to permit individual adjustment of said guides at opposite ends thereof and relative to each other and to retain said guides in adjusted position under frictional force.

* * * * *